United States Patent [19]

Rasi-Zade et al.

[11] Patent Number: 4,796,799
[45] Date of Patent: Jan. 10, 1989

[54] METHOD FOR MAKING SUCKER RODS

[75] Inventors: Artur T. O. Rasi-Zade; Nariman G. O. Kurbanov; Pavel M. Sutovsky; Talat M. O. Shikhlinsky; Khalid T. Kakhramanov; Avraam M. Rabinovich; Islam K. O. Karaev; Vladimir I. Timofeev, all of Baku; Oktai I. O. Ibragimov, deceased, late of Baku, all of U.S.S.R., by Samaya N. K. Ibragimova, administrator

[73] Assignee: Azerbaidzhansky Nauchno-Issledovatelsky I Proektno-Konstruktorsky Institut Neftyanogo Mashinostroenia, Baku, U.S.S.R.

[21] Appl. No.: 96,016

[22] PCT Filed: Nov. 26, 1985

[86] PCT No.: PCT/SU85/00094

§ 371 Date: Jul. 20, 1987

§ 102(e) Date: Jul. 20, 1987

[87] PCT Pub. No.: WO87/03330

PCT Pub. Date: Jun. 4, 1987

[51] Int. Cl.⁴ .................... B23K 20/12; B23K 31/02
[52] U.S. Cl. .................... 228/155; 228/176; 228/112; 403/271
[58] Field of Search .................... 228/112–114, 228/2, 155, 176; 403/271

[56] References Cited

U.S. PATENT DOCUMENTS

| 3,295,613 | 1/1967 | Anderson | 228/112 |
| 4,073,474 | 2/1978 | Hashimoto et al. | 228/112 |
| 4,205,926 | 6/1980 | Carlson | 403/266 |
| 4,367,838 | 1/1983 | Yoshida | 228/112 |
| 4,487,357 | 12/1984 | Simon | 228/114 |
| 4,522,529 | 6/1985 | Conley | 403/343 |
| 4,594,020 | 6/1986 | Hughes | 403/271 |

FOREIGN PATENT DOCUMENTS

| 1589272 | 4/1970 | France | 228/155 |
| 232855 | 2/1986 | German Democratic Rep. | 228/112 |
| 2104936 | 3/1983 | United Kingdom . | |
| 2107373 | 4/1983 | United Kingdom . | |

OTHER PUBLICATIONS

Metals Handbook Ninth Edition, vol. 6, pp. 719–728, 1983.

Primary Examiner—Nicholas P. Godici
Assistant Examiner—Samuel M. Heinrich
Attorney, Agent, or Firm—Fleit, Jacobson, Cohn & Price

[57] ABSTRACT

A method for making sucker rods comprises pressure-welding of the central rod-body blank with the rod-end blanks made from different materials, and upsetting of the end heads (8 and 9) from the welded sucker-rod blank. The length of the rod-end blanks is so selected that the weld joints (6, 7) be established, after the upsetting procedure, across the maximum cross-section of the sucker-rod heads (8 and 9).

1 Claim, 2 Drawing Sheets

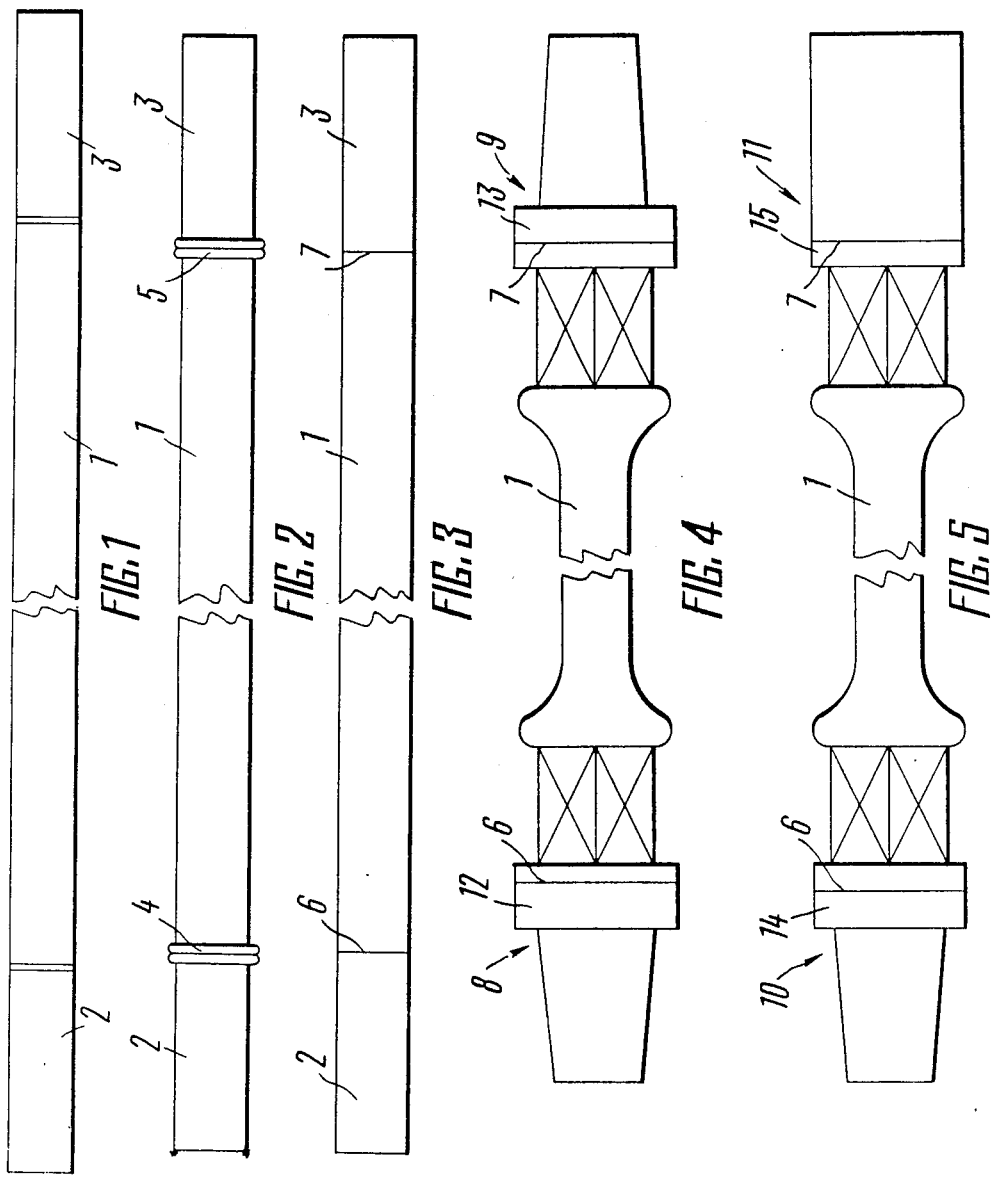

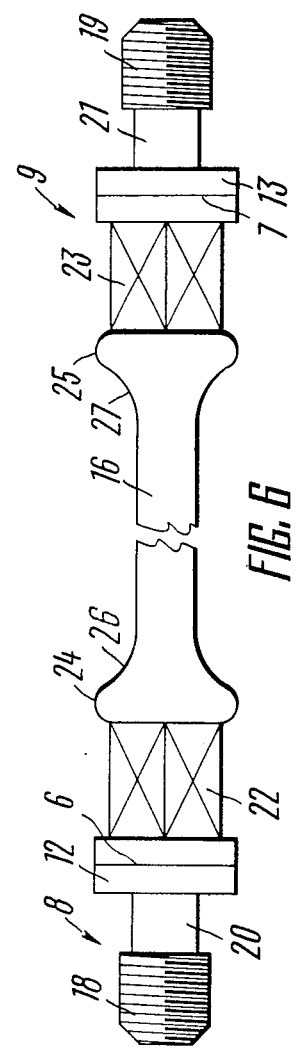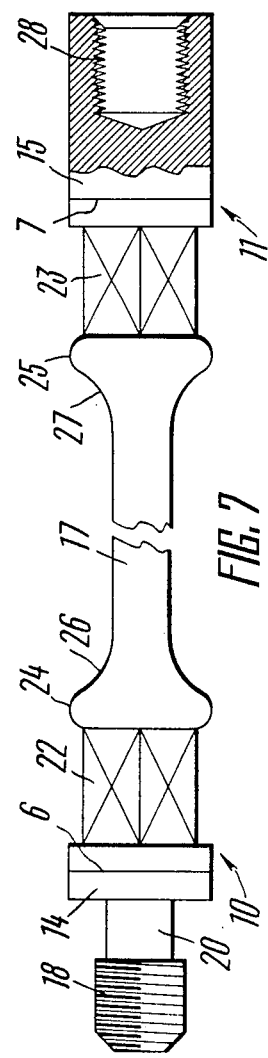

METHOD FOR MAKING SUCKER RODS

TECHNICAL FIELD

The present invention relates to sucker rods, namely, to methods for making sucker rods.

PRIOR ART

Sucker rods applied for oil production serve to impart drive to the well pump located at the hole bottom. A sucker rod is in fact a lengthy central stem or body provided at its both ends with end heads having a thread for the rods to join into a string which is then to run down the well. Each of the end heads of the sucker rod has two cylindrical collars, one of which, i.e., the more removed from the central stem or rod body serves for the threaded coupling interconnecting the sucker rods, to thrust against. The transition from the other collar located closer to the central stem or rod body, is in effect a long-sweep curve to reduce the concentration of stresses and provide a good fit onto the elevator, i.e., a tool with the aid of which the rod string round-trip operation is carried out during well work. A square cross-section neck is provided between the collars for the rods to make and break.

While in operation sucker rods undergo a complex cyclic loading. Since they operate in the liquid pumped out of the well, they are exposed to the effect of corrodents contained in the liquid. In addition, sucker rods are subjected to bending, especially when operating in directionally drilled or inclined wells, and their threaded joints undergo wear during their making and breaking.

All this is causative of premature wear and breakdowns, largely, of the sucker-rod threaded joints, especially in wells containing corrosive fluids.

There is known commonly a method for making sucker rods composed of a central stem or rod body and threaded end heads, incorporating upsetting the heads at the both ends of the long-length bar stock, followed by heat-treatment of the sucker rod and mechanical treatment or machining of the threaded ends to obtain a solid sucker rod (cf., e.g., U.S. Standard API Spec. 11B).

However, making sucker rods according to said method involves the use of expensive, predominantly alloyed steels containing Cr, Ni, Mo which is due to strict requirements to threaded end heads, since thread is a stress concentrator that affects adversely serviceability of sucker rods, especially those operating in wells containing corrosive fluids.

Another prior-art method for making sucker rods composed of a central stem or rod body and end heads is known to comprise upsetting and pressure-welding (cf., e.g., British Pat. No. 2,104,936A, CL. E21B 17/00 published Mar. 16, 1983).

According to said method, the sucker-rod production process consists in upsetting the end heads, their machining and subjecting to pressure welding, in particular, to friction welding to attach them to the central rod body, whereupon the resultant flush is eliminated from the weld joint obtained.

With such a method of making sucker rods the weld joint is located at a minimum rod cross-sectional area, which is of danger due to the effect of possible lack of penetration and other weld-joint defects impairing its strength. Furthermore, the fact that the weld joint is established at the place where the rod cross-sectional area changes in transition from the rod body to the head calls forth the constructional stress concentrator, which is operationally unreliable, especially when the sucker rod is subjected to bending during operation in directionally drilled or inclined wells.

In addition, it is due to unavoidable mutual displacement of the rod body and end heads in the course of welding that flash resulting from the welding process cannot be removed completely and flash residues affect adversely corrosion-fatigue strength of the material the rod body and the end heads are made from.

High-temperature heating of the weld-joint zone modifies the original structure of the metal of the rod body and of the end heads and causes residual heat stresses to arise, which impairs serviceability of a suckered rod.

The fact that the heads are made from a harder steel as compared to the steel from which the rod body is made, contributes to a lower consumption of expensive alloyed steel. However, even in this case a relatively high consumption of expensive steel for the head occurs, though high-hardness alloyed steel is required only for making the head threaded portion alone.

All the disadvantages stated hereinabove make it impossible to ensure high operating reliability of sucker rods that have to work under adverse conditions and to be exposed to repeated loading and to the corrosive effect of the liquid being extracted, this being due to low corrosion-fatigue strength of the material and low service life of the weld joint established according to the method discussed above.

ESSENCE OF THE INVENTION

It is a principal object of the present invention to provide a method for making sucker rods, whereby pressure-welding and upsetting would be so carried out as to make it possible to considerably cut down production costs of sucker rods and increase the operating reliability of sucker rods that have to work under arduous conditions especially in wells containing corrosive fluids.

The aforesaid object is accomplished due to the fact that in a method for making sucker rods composed of a central rod body and end heads, incorporating the upsetting and pressure-welding procedures, according to the invention, first the rod-body blank is welded together with the rod-end blanks which are made from different materials, to obtain a welded sucker-rod blank, whereupon the ends of said welded blank are upset into the end heads of a sucker rod, the length of the rod-end blanks being selected so that the weld joints be established, after the upsetting procedure, across the maximum cross section of the sucker rod head.

The method for making sucker rods as disclosed in this invention provides for a weld joint having much more area as compared with the rod body (i.e., as large as 3.5 to to 4.0 times when established across the maximum rod body cross-section), that is, within the zone of the minimum effective stresses and hence possessing the safety margin many times the maximum stress applied, which assures high operating reliability and durability of sucker rods.

Manufacture of sucker rods according to the method of the present invention does not require precision accuracy in welding the sucker-rod blanks and flash elimination, since the welded blank undergoes cold forming in the course of subsequent upsetting and is herein subjected to considerable plastic deformation. It is during the subsequent upsetting of the welded blank end heads and heat-treatment of the sucker rod that the effect of weld-heating of the weld-joint zone is eliminated.

The method of the present invention provides for a minimized consumption of expensive alloyed steel, since the length dimension of the sucker-rod blanks is selected so that the weld joint be established, after the upsetting procedure, across the maximum head cross-section, preferably in the middle portion of the thrust cylinder-shaped collar which is more removed from the rod body, that is, expensive alloyed steel is used for making the most loaded sucker-rod portion, i.e., the thread alone.

Manufacture of sucker rods according to the method of the present invention involves no high production expenditures, since the welding of sucker-rod blanks is a simple and nonexpensive operation.

SUMMARY OF THE DRAWINGS

Given below is a detailed disclosure of specific illustrative embodiments of the present invention to be read in conjunction with the accompanying drawings, wherein:

FIG. 1 is a general schematic view of sucker-rod body blanks before their welding in compliance with the method proposed herein, according to the invention;

FIG. 2 is a general schematic view of a welded sucker-rod blank showing flash in compliance with the method proposed herein, according to the invention;

FIG. 3 is a general schematic view of a welded sucker-rod blank after flash removal in compliance with the method proposed herein, according to the invention;

FIG. 4 is a general schematic view of a sucker-rod blank showing external threads after the upsetting procedure in compliance with the method proposed herein, according to the invention;

FIG. 5 is a general schematic view of a sucker-rod blank showing external and an internal thread after the upsetting procedure in compliance with the method proposed herein, according to the invention;

FIG. 6 is a general schematic view of a sucker-rod provided with external threads and made by the method, according to the invention; and FIG. 7 is a general schematic view of a sucker rod having an external and an internal thread and manufactured by the method, according to the invention.

PREFERRED EMBODIMENTS OF THE INVENTION

The method for making sucker rods proposed in the present invention is instrumental in the manufacture of sucker rods that have to operate first and foremost under arduous conditions in wells containing a corrosive fluid. The method, according to the invention, consists in that use is made of a central rod-body blank 1 (FIG.1) and rod-end blanks 2 and 3. A variety of materials can be used for making the aforesaid blanks, e.g., for the central rod-body blank 1 steel of the following mass percent composition: C—0.37 to 0.45; Si—0.17 to 0.37; Mn—0.5 to 0.8; cr—0.25 maximum; S—0.04 maximum; P—0.35 maximum, Fe being the balance, or steel of the following mass percent composition: C—0.17 to 0.25; Si—0.17 to 0.37; Mn—0.4 to 0.7; Ni—1.5 to 1.9; Mo—0.2 to 0.3; S and P—maximum 0.035 each, Fe being the balance, while for the rod-end blanks 2 and 3, an alloyed steel of the following mass percent composition: C—0.13 to 0.18; Si—0.17 to 0.37; Mn—0.35 to 0.65; Cr—0.35 maximum; Co—0.30 maximum; Ni—3.2 to 3.8; Mo—0.20 to 0.30, S and P—maximum 0.025 each, Fe being the balance.

First the central rod-body blank 1 and the rod-end blanks 2 and 3 are joined together by virtue of pressure welding, in particular, friction welding. The welding over, a flash 4 (FIG.2) and 5 resulting at the welded spots is eliminated to obtain the welded sucker-rod blank as shown in FIG. 3, featuring weld joints 6 and 7.

Then sucker-rod end heads 8, 9, 10 and 11 are upset from the welded sucker-rod blank as illustrated in FIGS. 4 and 5, respectively. The end heads 8 (FIGS. 4 and 5), 9 and 10 have an external thread, while the end head 11 (FIG. 5) has an external thread, depending on the construction of a particular sucker rod. The length of the rod-end blanks 2 and 3 is selected so that the weld joints 6 and 7 be established, after the upsetting procedure, across the maximum cross-section of the sucker-rod heads 8, 9, 10, 11, preferable in the middle position of thrust cylindrical collars 12, 13, 14, 15 of the respective heads 8, 9, 10, 11 that are more removed from the central rod body 1. As it has already been stated hereinbefore, depending on the sucker-rod construction there is carried out the upsetting procedure either for an external thread alone (FIG. 4), or for an external and an internal thread (FIG. 5), the rod-end blanks 2 (FIG. 1) and 3 may be either equal or different in length, respectively.

Location of the weld joints 6 (FIGS. 4 and 5) and 7, after the upsetting procedure, in the middle portion of the thrust collars 12, 13, 14, 15 proves to be the most expedient, since in this case the maximum area and hence the strength of the weld joints 6 and 7 are ensured with a relatively low consumption of expensive alloy steel made use of for the manufacture of the rod-end blanks 2 (FIG. 1) and 3.

Thus, for instance, for an externally threaded sucker rod (FIG. 4) having the diameter of its central rod-body blank 1 (FIG. 1) equal to 22 mm ($\frac{7}{8}$"), the length of each of the rod-end blanks 2 and 3 of the same diameter is assumed to be about 150 mm, whereby the weld joints 6 (FIG. 4) and 7 are situated in the middle portion of the thrust collars 12 and 13 of the end heads 8 and 9. With a total sucker-rod length of about 8000 mm, the consumption of alloyed-steel bar stock for making the rod-end blanks 2 and 3 is in this case about 300 mm, or on the order of 4 percent of the total rod length.

Whenever necessary the length of the rod-end blanks may be increased but on condition that the weld joints be in every case established across a section larger than the section of the central rod-bod blank, e.g., in the zone of the head square neck, or in that of its cylinder-shaped collar situated nearer to the central rod body.

After heat-treatment and machining of the rod end-heads upset as it is the routine practice in manufacture of sucker rods, there are obtained the finished welded sucker rods (FIGS. 6 and 7), each consisting of a central rod body 16 and 17 and the end heads 8, 9, 10, 11 respectively.

The welded sucker rod as shown in FIG. 6 and made according to the method of the invention, has the end heads 8, 9 located each at either end of the central rod body and provided with external threads 18, 19, cylindrical necks 20, 21, the cylindrical thrust collars 12, 13 located more distantly to the rod body 16, square-shaped necks 22, 23, cylindrical collars 24, 25 spaced nearer to the central rod body 16 and featuring smooth long-sweep transitions 26, 27 from the collars 24, 25 to the central rod body 16, adapted to be a good fit with the elevator. The weld joint 6 and 7 are located in the middle portion of the thrust collars 12, 13, that is, across the maximum cross-section of sucker-rod heads 8 and 9.

The construction of the sucker rod as illustrated in FIG. 7 and having the external thread at one of its ends and an internal thread 28 at the other end, differs from the construction of the sucker rod shown in FIG. 6 solely in that the weld joint 7 (FIG. 7) is situated in the middle portion of the thrust collar 15 provided with the internal thread 28.

Making of sucker rods according to the method of the invention, while being inexpensive, enables the consumption of expensive alloy steel to be much (by more than 90 percent) reduced, which in turn reduces the production costs of sucker rods, and provides for the maximally high reliability of the weld joints and excellent strength and corrosion resistance of the threads. Since the rod diameter is determined by the strength of material applied and of the thread size, the thread size in sucker rods made to the method of the invention can be reduced whenever necessary, if a stronger material is used, which makes it possible not only to diminish the overall dimensions of the sucker rod itself but also to employ smaller-sized strings, wherein sucker rods made to the method of invention are used.

Industrial Applicability

The invention can find application for making sucker rods used in oil production.

What is claimed is:

1. A method for making sucker rods composed of a central rod body (16, 17) and end heads (8, 9, 10, 11), incorporating upsetting and pressure-welding procedures, characterized in that first a rod-blank (1) is welded together with rod-end blanks (2, 3), which are made from different materials than the rod-body blank, to obtain a welded sucker-rod blank, whereupon end heads (8, 9, 10, 11) are upset from the welded sucker-rod blank, while the length of the rod-end blanks (2, 3) are so selected that weld joints (6, 7) are established, after the upsetting procedure, across the maximum cross-section of the end heads (8, 9, 10, 11).

* * * * *